United States Patent
Lam et al.

(10) Patent No.: US 10,353,264 B2
(45) Date of Patent: Jul. 16, 2019

(54) LAYERED TRANSPARENT CONDUCTIVE ELECTRODE STRUCTURE FOR AN OPTICAL FILTER

(71) Applicant: SWITCH MATERIALS INC., Burnaby (CA)

(72) Inventors: Duhane Lam, Vancouver (CA); Glen R. Bremner, New Westminster (CA); Jonathan R. Sargent, Burnaby (CA); Jeremy G. Finden, North Vancouver (CA); Peter A. Von Hahn, Vancouver (CA)

(73) Assignee: SWITCH MATERIALS INC., Burnaby (CA)

(*) Notice: Subject to any disclaimer, the term of this patent is extended or adjusted under 35 U.S.C. 154(b) by 0 days.

(21) Appl. No.: 15/852,202

(22) Filed: Dec. 22, 2017

(65) Prior Publication Data

US 2018/0180963 A1    Jun. 28, 2018

Related U.S. Application Data

(60) Provisional application No. 62/438,958, filed on Dec. 23, 2016.

(51) Int. Cl.
 *G02F 1/155* (2006.01)
 *G02F 1/01* (2006.01)
 (Continued)

(52) U.S. Cl.
 CPC ............ *G02F 1/155* (2013.01); *G02F 1/0126* (2013.01); *G02F 1/13439* (2013.01); *G02F 1/163* (2013.01); *G02F 2203/01* (2013.01)

(58) Field of Classification Search
 CPC .. G02B 5/23; G02B 5/008; G02B 1/04; G02F 1/0126; B60J 3/04
 (Continued)

(56) References Cited

U.S. PATENT DOCUMENTS 7,009,750 B1 * 3/2006 Westfall ............... G02F 1/1523
 359/240
8,441,707 B2 5/2013 Lam et al.
(Continued)

FOREIGN PATENT DOCUMENTS

WO 2014/134714 A2 9/2014

OTHER PUBLICATIONS

Cui et al., "Indium Tin Oxide Alternatives—HighWork Function Transparent Conducting Oxides as Anodes for Organic Light-Emitting Diodes," *Advanced Materials* 13(19): 1476-1480, 2001.
(Continued)

*Primary Examiner* — Mohammed A Hasan
(74) *Attorney, Agent, or Firm* — Cozen O'Connor

(57) ABSTRACT

A layered structure for a variable transmittance optical filter includes a transparent conductive electrode and a substrate layer. The transparent conductive electrode includes a charge injection layer that has one or more of gold, molybdenum, palladium, reduced graphene oxide, amorphous indium gallium zinc oxide (a-IGZO), platinum, nickel, ruthenium, rhodium, asmium, selenium, tellurium, graphene, and carbon nanotubes. The substrate layer includes a transparent substrate and is positioned relative to the transparent conductive electrode such that light passing through the transparent conductive electrode passes through the substrate layer.

29 Claims, 8 Drawing Sheets

(51) Int. Cl.
*G02F 1/163* (2006.01)
*G02F 1/1343* (2006.01)
(58) Field of Classification Search
USPC .......................................... 351/241; 359/241
See application file for complete search history.

(56) References Cited

U.S. PATENT DOCUMENTS

2014/0141600 A1* 5/2014 Lee ..................... H01L 21/0242
                                                         438/479
2016/0147125 A1* 5/2016 Theodore ................ G02F 1/155
                                                         136/255
2016/0357108 A1* 12/2016 Hsu ....................... G03F 7/2051

OTHER PUBLICATIONS

Lansåker, P., "Gold-Based Nanoparticles and Thin Films," *Acta Univeritatis Upsaliensis, Digital Comprehensive Summaries of Uppsala Dissertations from the Faculty of Science and Technology*, 2012, 102 pages.

* cited by examiner

LAYERED TRANSPARENT CONDUCTIVE ELECTRODE STRUCTURE FOR AN OPTICAL FILTER

FIELD OF THE DISCLOSURE

The present disclosure relates to a layered transparent conductive electrode (TCE) structure for an optical filter, in particular a variable transmittance optical filter. The present disclosure also relates to optical filters incorporating such a layered TCE structure.

BACKGROUND TO THE DISCLOSURE

Optical filters have been used in glazings in window technology to control the flow of light and heat through the glazing. Such filters may be used on any sort of window, including those in buildings, vehicles, aircraft, spacecraft, ships or the like. Optical filters have also been used to regulate lighting and heating levels, for glare reduction, and energy load management. As an example, buildings consume over one third of all energy and over two thirds of the electricity used in the United States, and are responsible for about one third of all greenhouse gas (GHG) emissions, as well as about 30% of a building's energy loss. As such, windows with improved technology for reducing heat loss and solar heat gain can offer significant benefits and cost savings.

Optical filters have also found application in ophthalmic devices to control the amount of light impacting the eye. Opthalmic applications include, for example, prescription and non-prescription glasses, goggles, sunglasses, visors, and safety eyewear.

In order to dynamically control the flow of light and heat through an optical filter, there are a number of technologies that have been used in optical filters, and related devices and applications, including photochromics, electrochromics, liquid crystals, thermochromics, and suspended particle displays. In particular, electrochromic, liquid crystal, and suspended particle displays or devices tend to alternate between dark and light operating states (or transmissive states) in response to electricity. Electrochromic optical filters, for example, tend to darken when a voltage differential is applied across a pair of terminals electrically coupled to different sides of the electrochromic material, and tend to lighten when the polarity of the voltage differential is reversed. On the other hand, photochromic displays or devices tend to automatically darken when exposed to sunlight or UV, and lighten in the absence of sunlight or UV through a thermal back reaction.

It is known that repeated switching of an optical filter from one state of light transmissibility to another state of light transmissibility can cause the optical filter to degrade over time. In particular, the electrical stability and durability of such devices can be worsened through extensive switching of the optical filter, resulting in a filter whose light transmissibility reduces over time. Attempts have therefore been made to improve the electrical stability and durability of switchable optical filters, to thereby increase their lifetime of usability. The current disclosure describes an improved layered transparent electrode structure that may be used in variable transmission switchable optical filters, and that increases their electrical stability and durability.

SUMMARY OF THE DISCLOSURE

According to a first aspect, there is provided a layered transparent conductive electrode structure for an optical filter, comprising: a transparent conductive electrode comprising a charge injection layer comprising one or more of gold, molybdenum, palladium, reduced graphene oxide, amorphous indium gallium zinc oxide (a-IGZO), platinum, nickel, ruthenium, rhodium, asmium, selenium, tellurium, graphene, and carbon nanotubes, and a substrate layer comprising a transparent substrate, wherein the substrate layer is positioned relative to the transparent conductive electrode such that light passing through the transparent conductive electrode passes through the substrate layer.

The layered TCE structure, when incorporated into a switchable optical filter, may provide for increased electrical stability and durability of the filter, thereby extending the lifetime of the filter. Furthermore, it may be possible to inject charge into the optical filter at lower voltages, and electrical stability and durability may in some cases be increased to over 1,000 hours on electrical-hold testing, as opposed to less than 100 hours with prior art, Indium Tin Oxide ITO-only electrodes.

The transparent conductive electrode may comprise multiple surfaces. The substrate layer may comprise multiple surfaces. The transparent conductive electrode may be positioned relative to the substrate layer such that a surface of the transparent conductive electrode with the largest surface area (which may be referred to as a major surface) may overlap with a major surface of the substrate layer. The overlap may be such that the major surface of the transparent conductive electrode wholly overlaps the substrate layer, or only partially overlaps the substrate layer.

The charge injection layer may comprise multiple surfaces. The substrate layer may comprise multiple surfaces. The charge injection layer may be positioned relative to the substrate layer such that a surface of the charge injection layer with the largest surface area (which may be referred to as a major surface) may overlap with a major surface of the substrate layer. The overlap may be such that the major surface of the charge injection layer wholly overlaps the substrate layer, or only partially overlaps the substrate layer.

The substrate layer may be flexible.

The substrate layer may be adjacent the transparent conductive electrode.

The substrate layer may be directly adjacent (e.g. in contact with) the transparent conductive electrode, or alternatively one or more other layers may separate the substrate layer from the transparent conductive electrode.

The charge injection layer may be adjacent the substrate layer.

The substrate layer may be directly adjacent (e.g. in contact with) the charge injection layer, or alternatively one or more other layers may separate the substrate layer from the charge injection layer.

The charge injection layer may comprise, consist, or consist essentially of gold.

The charge injection layer may comprise one or more of: gold, molybdenum, palladium, reduced graphene, and amorphous indium gallium zinc oxide (a-IGZO).

The charge injection layer may be continuous or discontinuous.

Thus, in embodiments which include a variable transmittance layer, the variable transmittance layer may be in direct contact with the layer immediately underneath the charge injection layer.

The charge injection layer may be between 5 nm and 20 nm thick.

The transparent conductive electrode may further comprise a transparent conductive layer adjacent the charge injection layer. The transparent conductive layer may be thicker than the charge injection layer.

The transparent conductive layer may be directly adjacent (e.g. in contact with) the charge injection layer, or alternatively one or more other layers may separate the transparent conductive layer from the charge injection layer.

The transparent conductive layer may itself be multi-layered.

The transparent conductive electrode may further comprise an adhesion layer comprising an adhesive for adhering the charge injection layer to the transparent conductive layer.

The charge injection layer may comprise gold, the adhesive may comprise chromium, and the transparent conductive layer may comprise indium tin oxide.

The transparent conductive layer may comprise a lower bulk conductivity than the charge injection layer.

The transparent conductive layer may be thicker than the charge injection layer.

The transparent conductive layer may comprise a maximum sheet resistance of 100 Ohms/square.

The transparent conductive layer may comprise indium tin oxide.

The charge injection layer may be between 0.1 nm and 10 nm thick.

The transparent conductive layer may comprise a greater through-plane conductivity than the charge injection layer.

The transparent conductive layer may be more transparent than the charge injection layer.

The transparent conductive layer may comprise a greater sheet resistance than the charge injection layer.

The transparent conductive layer may comprise one or more of ITO, silver, and aluminum zinc oxide (ZnO:Al).

The transparent conductive electrode may further comprise a barrier layer separating the transparent conductive layer from the charge injection layer.

The barrier layer may comprise indium tin oxide.

The charge injection layer may comprise gold and the transparent conductive layer may comprise silver.

The layered structure may further comprise a variable transmittance layer comprising an electrochromic and/or photochromic formulation.

The electrochromic and/or photochromic formulation may be configured such that, when exposed to light, the variable transmittance layer transitions from a first state of transmittance to a second state of transmittance, and, when exposed to an electrical stimulus, the variable transmittance layer transitions from the second state of transmittance to the first state of transmittance.

The variable transmittance layer may be adjacent the charge injection layer.

The variable transmittance layer may be directly adjacent (e.g. in contact with) the charge injection layer, or alternatively one or more other layers may separate the variable transmittance layer from the charge injection layer.

The layered structure may further comprise an electrical lead connected to the transparent conductive electrode.

The transparent substrate may comprise one or more of: polyethylene naphthalate, polyethylene terephthalate and/or, glass.

According to another aspect, there is provided an optical filter comprising: first and second layered structures, each layered structure comprising: a transparent conductive electrode comprising a charge injection layer comprising one or more of gold, palladium, molybdenum, reduced graphene, and amorphous indium gallium zinc oxide (a-IGZO); and a substrate layer comprising a transparent substrate; and a variable transmittance layer adjacent the charge injection layers of the first and second layered structures, the variable transmittance layer comprising an electrochromic and/or photochromic formulation.

The optical filter may be laminated onto a single piece of glass, or between two pieces of glass, for use in automotive windows, transportation (plane, train, boat) windows, as well as architectural windows and eyewear applications. Such optical filters may also be used in electronic application where blocking of light is required (e.g. OLED TVs built into glass walls).

The optical filter may further comprise electrical leads connected to the transparent conductive electrodes of the first and second layered structures.

According to another aspect, there is provided a system for controlling an optical filter, comprising: an optical filter according to any of the foregoing aspects or suitable combinations thereof; and control circuitry operable to apply an electrical stimulus to the variable transmittance layer.

According to another aspect, there is provided a layered structure for a variable transmittance optical filter, comprising: a transparent conductive electrode comprising a charge injection layer comprising a layer of gold that is at least 1 nm thick; and a substrate layer comprising a transparent substrate, wherein the substrate layer is positioned relative to the transparent conductive electrode such that light passing through the transparent conductive electrode passes through the substrate layer.

The layer of gold may be between 1 nm and 10 nm thick.

The layer of gold may be at least 10 nm thick.

The charge injection layer may be substantially entirely gold.

The control circuitry may comprise a processor such as a programmable logic controller, and associated memory, for controlling application of a voltage across the optical filter. In one embodiment, the processor may be communicatively coupled to switching circuitry. The switching circuitry may comprise a pair of input voltage terminals for receiving an input voltage, and a pair of load terminals for electrically coupling to terminals of the optical filter. The processor may controllably apply a voltage to the optical filter by controllably operating the switching circuitry.

BRIEF DESCRIPTION OF THE DRAWINGS

Detailed embodiments of the disclosure will now be described in conjunction with the accompanying drawings of which.

DETAILED DESCRIPTION OF SPECIFIC EMBODIMENTS

The present disclosure seeks to provide an improved layered structure for an optical filter, and an improved optical filter comprising such a layered structure. While various embodiments of the disclosure are described below, the disclosure is not limited to these embodiments, and variations of these embodiments may well fall within the scope of the disclosure which is to be limited only by the appended claims.

Figure 1:
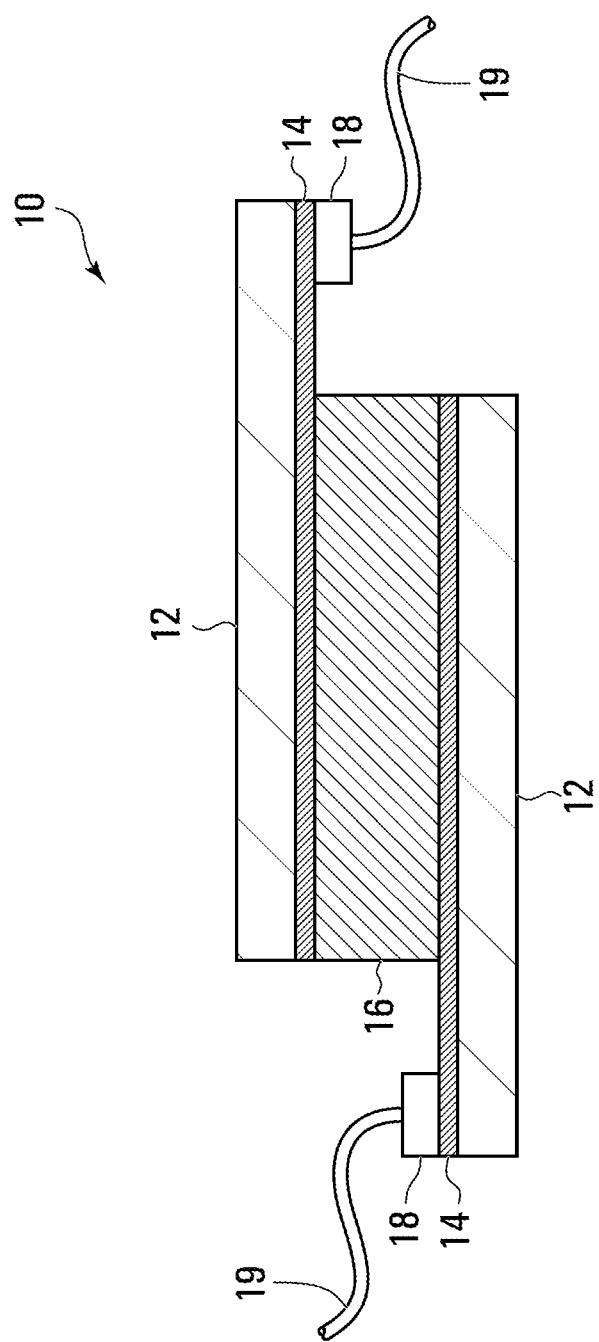
FIG. 1 is cross-sectional view of an optical filter in accordance with an embodiment of the disclosure.

FIG. 1 shows a cross-sectional view of a switchable optical filter 10, in accordance with an embodiment of the disclosure. Switchable optical filter 10 is similar to the switchable device described in U.S. Pat. No. 8,441,707 (incorporated herein by reference), with one difference being that an improved transparent conductive electrode (TCE) is provided, as will now be described in more detail. As used herein, in certain embodiments, "transparent" means "non-opaque".

Switchable optical filter 10 comprises two layers of overlapping polymeric substrate 12. Polymeric substrate 12 can be any type of transparent conductive film, such as PET (polyethylene terphthalate). Other transparent polymeric films, such as polyethylene naphthalate (PEN), polycarbonate (PC), and polyvinyl chloride (PVC), can also be used for substrate 12. In one embodiment, PEN is used for the substrate because of its improved chemical resistance relative to PET, PVC and PC. More generally, PEN's improved chemical resistance in certain embodiments may additionally or alternatively be relative to the products of any chemical reactions that may be caused by contact with one or more of the switching material, oxidization, and other changes.

A gold coating 14, or layer, is applied to each substrate 12 and forms a transparent conductive electrode (TCE) on each substrate 12. This layering may be contrasted with the switchable device described in U.S. Pat. No. 8,441,707, wherein instead of a gold coating a layer of indium tin oxide (ITO) is applied to each substrate, the ITO forming the transparent conductive electrode. In the present embodiment, in place of ITO, a layer of gold is used as the conductive material to form the transparent conductive electrode. A layer of switching material 16 is disposed between gold coatings 14 such that switching material 16 is in contact with gold coatings 14. Switching material 16 comprises a hybrid photochromic/electrochromic formulation formed of one or more chromophores that are reversibly interconvertible between coloured (dark) and uncoloured (light) states; the switching material may further comprise a solvent portion, polymer(s), salts, or other components to support the interconversion of the chromophore between coloured and uncoloured states when exposed to light (in particular UV light) or voltage. Some examples of chromophores may include fulgides, diarylethenes or dithienylcyclopentenes. However, in alternative embodiments (not depicted), other types of optical filters comprising alternate switching materials with similar behaviour to hybrid photochromic/electrochromic switching materials, may also be employed. Particular formulations which may be used for switching material 16 include those described in U.S. Pat. No. 8,441,707 (incorporated herein in its entirety).

The edges of switchable optical filter 10 are sealed with an edge seal (not shown) in order to keep the plasticizer in switching material 16 from escaping. Bus bars 18 are attached to gold coatings 14 in order to provide a connection between gold coatings 14 and wire leads 19. As known in the art, wire leads 19 are connected to control circuitry (not shown) which may be used to selectively apply a voltage across switchable optical filter 10, thereby causing switching material 16 to transition from one state of light transmissibility to another state of light transmissibility.

Using switchable optical filter 10 of FIG. 1, good electrochemical fading was observed when measured in terms of uniformity and extent of fading, and to a lesser degree speed of fading. In addition, the voltage required to electrofade switchable optical filter 10 was about 100 mV less than that required to electrofade a film comprising a layer of ITO instead of a layer of gold, when the same switching material was used (0.95 Volts for gold vs 1.05 Volts for ITO). If the gold is applied in a thin-enough layer, it allows sufficient light transmission while providing good continuous electrical conductivity over the surface area of the electrode. In an example, a 10 nm layer of gold was sputtered onto a 5 mil-thick PEN substrate. This resulted in a light transmittance of about 63% and a sheet resistance of about 10 Ohms/square. The overall light transmission was lower than that of a typical transparent conductive electrode using ITO (OC50 from Eastman™ on a 5 mil-thick PET substrate, resulting in a light transmission of about 83%). However, the sheet resistance was five times less than the sheet resistance of CO50, even though the ITO layer in CO50 was much thicker than the gold layer in the current example. Of course, other gold thicknesses are possible, depending on the desired light transmittance and sheet resistance. For example, gold coatings 12 can be from 5 nm to 20 nm thick.

As will be discussed later, the improved gold-coated switchable optical filter described above exhibits improved electrical stability and durability, due to better electrochemical compatibility between the gold and the chemistry of switching material 16. In other embodiments, other materials such as palladium, molybdenum, reduced graphene oxide, amorphous indium gallium zinc oxide (a-IGZO), platinum, nickel, ruthenium, rhodium, asmium, selenium, tellurium, graphene, and carbon nanotubes) can be used in place of the gold to provide improved chemical compatibility and improved durability.

One indication of chemical compatibility of these materials is their work function. The work functions of a number of materials that can be used in the charge injection layer are shown in the table below. All of these materials have work functions 4 eV or higher and are thus reasonable candidates for charge injection materials. The work function of a material is an indication of its ability to provide good charge injection, but is not the only determinant. For example, the material needs to be chemically compatible for the switching materials being used. A work function in the right range also does not necessarily indicate long-term durability of the electrode with a specific formulation (e.g., as in the case of ITO and some examples of switching materials), and as such the specific material needs to be tested with the switching material.

| Electrode | Work function (eV) |
| --- | --- |
| Mo | 4.4-5.0 |
| Au | 5.1-5.5 |
| Ni | 5.0-5.4 |
| Pd | 5.2-5.6 |
| Pt | 5.1-5.9 |
| Se | 5.9 |
| Te | 5.0 |
| Graphene | 4.6-5.2 |
| Reduced graphene oxide r-GO | 4.5-5.5 |
| Carbon nanotubes (both single-walled and multi-walled) | 4.7-5.1 |
| ITO | 4.3-5.2 |
| a-IGZO (amorphous indium gallium zinc oxide) | ~4.5 |

| Electrode | Work function (eV) |
|---|---|
| GITO (gallium indium tin oxide) | 5.2 |
| GIO (gallium tin oxide) | 5.2 |
| ZITO (zinc indium tin oxide) | 6.1 |
| NiO | 5.2-5.4 |

Figure 2:
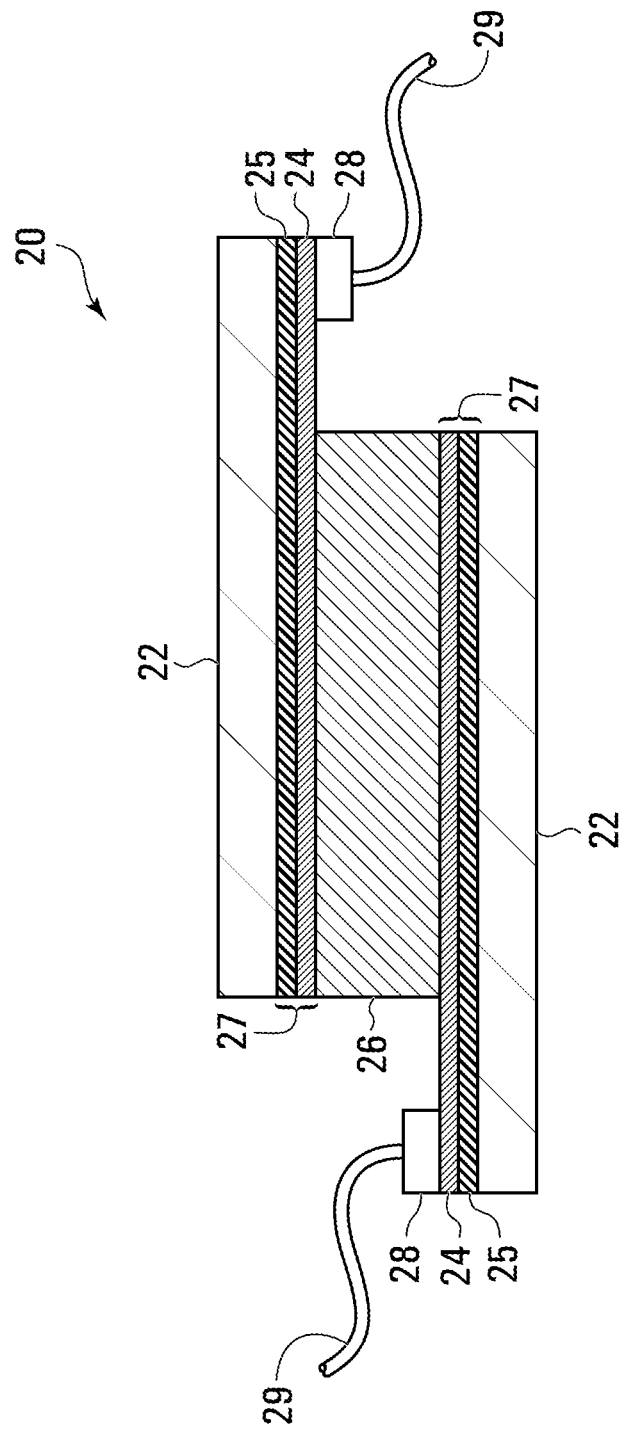
FIG. 2 is cross-sectional view of an optical filter in accordance with an embodiment of the disclosure.

Now turning to FIG. 2, there is shown another embodiment of a switchable optical filter 20. Switchable optical filter 20 is similar to switchable optical filter 10, and like features are labelled using like reference numbers. However, rather than comprising transparent conductive electrodes formed of single gold layers, switchable optical filter 20 comprises transparent conductive electrodes 27 that are multi-layered. In particular, each transparent conductive electrode 27 comprises a thin layer of gold 24 deposited on top of a layer of indium tin oxide (ITO) 25. In this embodiment, the gold again provides improved electrochemical compatibility with the switching formulation in switching material 26. However, the ITO provides the bulk of the in-plane conduction so that gold coatings 24 can be made much thinner and will therefore exhibit greater light transmittance. In certain embodiments, by "much thinner" it is meant that the gold layer may be between approximately 5 and approximately 10 nm in one embodiment, approximately 2.5 nm in another embodiment, and approximately 1 nm in another embodiment.

In a particular example of the embodiment of FIG. 2, switchable optical filter 20 comprises a polymeric PET substrate 22 as a base, for example 5 mil-thick (0.125 mm) ST504 PET from DuPont™. An ITO coating 25 is applied to substrate 22 and provides approximately 50 Ohms/square of sheet resistance. Other sheet resistances up to 100 Ohms/square or 1,000 Ohms/square and down to 1 Ohm/square or less are also possible, depending on the current draw of switching material 26 and the distance between bus bars 28 on optical filter 20. At 50 Ohms/square, ITO coating 25 is of the order of 100 nm thick. ITO coating 25 can be applied via a vacuum sputtering process by suppliers such as Eastman Flexvue™ of Canoga Park, Calif.; Nitto Denko™ of Tokyo, Japan; or Fraunhaufer Institute™ of Munich, Germany.

A thin layer of gold 24 is added on top of ITO layer 25, also by a sputtering process. The gold can be between 0.1 and 10 nm thick. In an example, a 5 nm thick layer of gold 24 is used on top of a 100 nm thick layer of ITO 25. This layer of gold can be added by the same supplier of the ITO-sputtered layer by using a gold target in the sputtering machine instead of an ITO target, or both layers can be applied in a single pass in a multi-head sputtering machine. In the embodiment of FIG. 2, the combination of gold layer 24 and ITO layer 25 form a multi-layer transparent conductive electrode 27. Switching material 26 is coated onto the multi-layer TCE 27 in the same way that it would be coated onto the single-layer gold TCE (FIG. 1). A second, similar multi-layer TCE 27 is laminated on top of switching material 26, and bus bars 28 are attached to multi-layer TCEs 27 to facilitate conduction of electricity via wire leads 29. In some examples, a bus bar may not be required and wire leads 29 can be connected directly to multi-layer TCEs 27. In other examples, the second multi-layer TCE can be of a different construction to the first multi-layer TCE. For example, the second multi-layer TCE could comprise only a single layer of gold, or in another example the second TCE could be a standard ITO electrode. In the last example, the performance of the optical device will still be improved, but not to the same extent as it would be if both electrodes used the improved mutli-layer TCE as described in the current invention. Optical filter 20 may also include a seal around the edge of optical filter 20 for keeping the plasticizer in the formulation of switching material 26, as described in PCT International Publication No. WO 2014/134714 (incorporated herein by reference).

Figure 3:
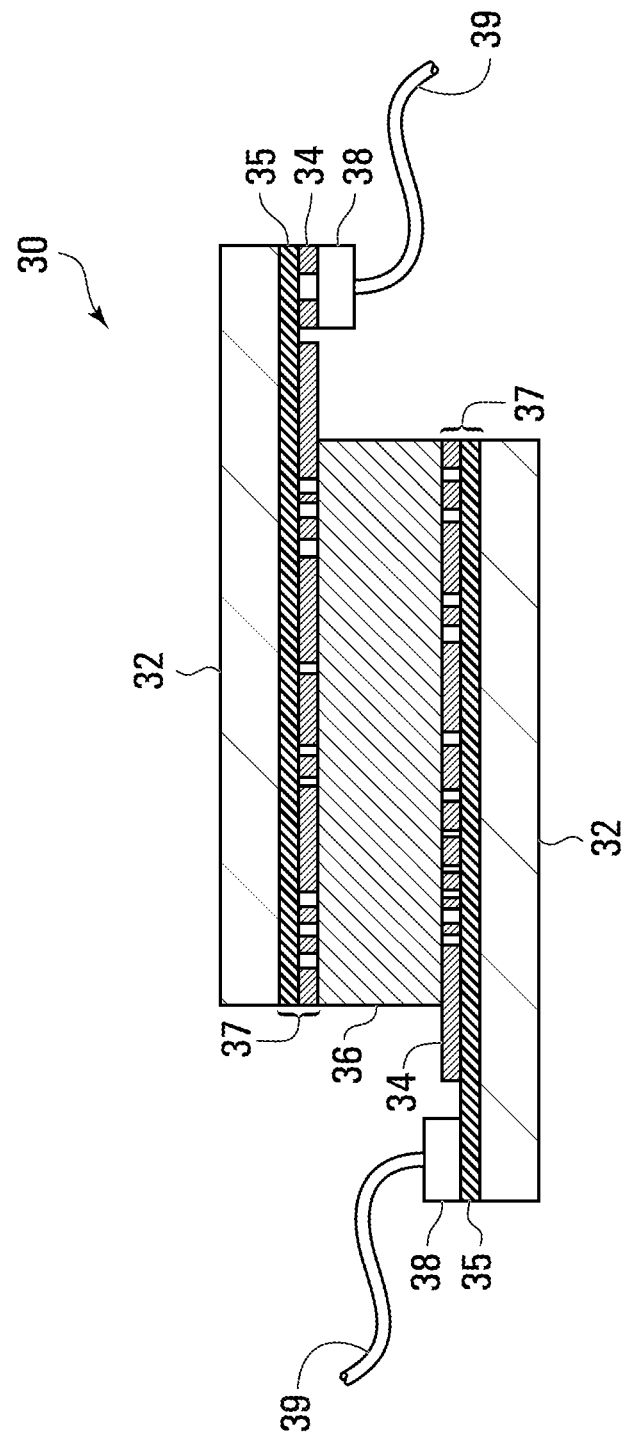
FIG. 3 is cross-sectional view of an optical filter in accordance with an embodiment of the disclosure.

In some embodiments, rather than a continuous coating, the relatively thin gold layer can form discontinuous "islands" on top of the ITO layer, as shown in FIG. 3 (with like features being labelled with like reference numbers). This can happen because it is more difficult to obtain continuous coatings with a very thin layer of gold as opposed to a thicker layer of gold. Nonetheless, even with discontinuous coatings of gold 34, the multi-layer TCE 37 still functions well as an electrode for the switching material 36. While a 5 nm-thick gold layer contributes very little or not at all to the through-plane conductivity of the transparent conductive electrode as a whole, the gold provides a good electrochemical interface with the switching material. Furthermore, even though the gold itself has higher bulk conductivity than the ITO, the ITO layer provides the through-plane conductivity. In the meantime, the ITO layer is more transparent than the gold layer. Thus, keeping the gold layer thin has the advantage of allowing more light to pass through, since gold in its bulk format is opaque.

For example, a multi-layer TCE 37 with a 5 nm layer of gold 34 on top of an ITO layer 35 has a light transmittance of about 74.3%, compared to 63% for the gold-only TCE (FIG. 1) and 83% for typical ITO TCEs (the prior art). Moreover, a thin, discontinuous gold layer may provide better optical transmission properties than a continuous layer of gold of the same thickness. For instance, the sheet resistance of the above example is about 50 Ohms/square, since the ITO is providing the bulk of the in-plane conductivity. This sheet resistance is higher than in the gold-only TCE embodiment (FIG. 1), but the light transmittance is higher. In one embodiment, a 5 nm layer of gold 34 is in practice a discontinuous layer, while a 10 nm layer of gold 34 is in practice a continuous layer.

In another example of a multi-layer TCE 27 as shown in FIG. 2, the gold layer 24 is continuous and has a sheet resistance of about 10 Ohms/square. The gold layer 24 is positioned in contact with an ITO layer 25 that is thinner than, and hence has a higher sheet resistance than, the ITO layer 25 in the example of FIG. 2, described above. For example, the layer of ITO 25 could have a sheet resistance of about 300 Ohms/square, and may have a thickness of about 25 nm for instance. In this case, most of the in-plane conduction occurs in the gold layer 24. The transmittance is only slightly less than the single-layer TCE 14 with 10 Ohms/square gold (FIG. 1). The transmittance in this example was found to be surprisingly higher than predicted by looking at the transmittances of the gold and ITO layers 24, 25 on their own. This is likely due to the interactions between thin films and light when the thickness of the thin films is in the range of the wavelengths of visible light passing through the thin films. In this example, the substrate 22 is more robust than in the above-described example of FIG. 2 because scratches in the gold or areas where the gold 24 has been rubbed off can be bridged by the more robust and better-adhered ITO 25. If the distances over which the ITO 25 is required to bridge the gold 24 are small, the voltage losses are negligible despite the higher sheet resistance of the thin ITO layer 25. This particular example is suitable for applications in which a good sheet resistance is desired and in which a slightly lower transmission is acceptable.

The ITO layer 25, 35 also provides a good chemical barrier between the switching formulation 26, 36 and the substrate 22, 32. Therefore, in the embodiment of FIG. 2 it may be advantageous to use PET instead of PEN for substrate 22. In the case of the gold-only TCEs (FIG. 1), gold coatings 14 were found to be more permeable to plasticizers and solvents used in switching formulation 16, when contrasted to the ITO used in the transparent conductive electrodes 27, 37 of FIGS. 2 and 3. The plasticizer would soak through gold coatings 14 and into substrates 12, causing "crazing" (swelling of the plastic and cracking of the conductive coating) and other degradation. A gold layer on a more chemically-resistant substrate, such as PEN, helped alleviate the swelling and crazing issues. However, PET is less expensive than PEN, and thus a multi-layer TCE with a good barrier layer (e.g. ITO layers 25, 35) provides a cost saving.

In the embodiments of FIGS. 2 and 3, note that bus bars 28, 38 can be attached either to gold layers 24, 34 (whether continuous or discontinuous), or directly to ITO layers 25, 35. Attachment of bus bars 28, 38 to ITO layers 25, 35 may happen as a result of the thin gold layer 24, 34 having worse adhesion to substrate than the ITO does, so it may be wiped off inadvertently when the coated switching material is removed from the substrate. Regardless, it does not affect the functioning of switching optical filters 20, 30, since the through-plane conduction occurs in ITO layers 25, 35. Therefore, switching optical filters 20, 30 will function as long as there exists an electrically conductive path from wire leads 29, 39, and through ITO layers 25, 35, with or without a gold layer in-between.

Figure 4:
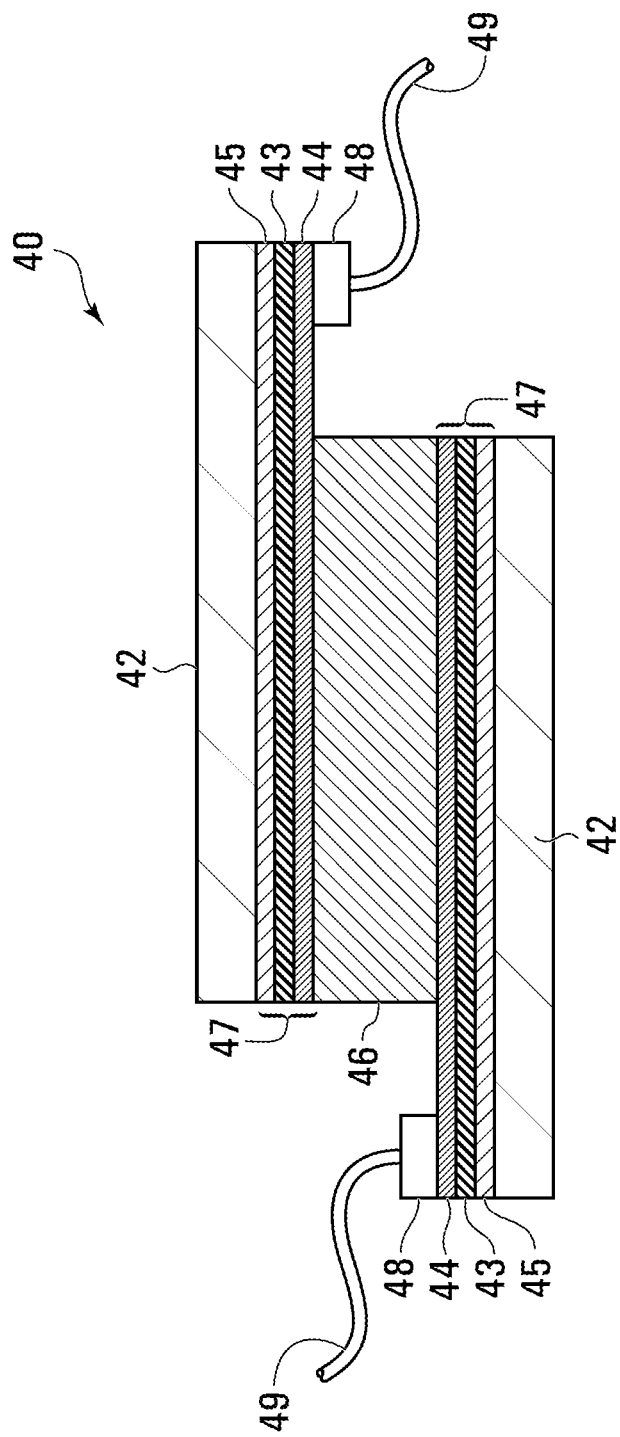
FIG. 4 is cross-sectional view of an optical filter in accordance with an embodiment of the disclosure.

Again, as described above, in different embodiments other materials are used in place of gold, as long as they exhibit good electrochemical compatibility with the formulation in the switching material. For example, other materials such as palladium, molybdenum, reduced graphene oxide, amorphous indium gallium zinc oxide (a-IGZO), platinum, nickel, ruthenium, rhodium, asmium, selenium, tellurium, graphene, and carbon nanotubes could be used. As an example, in a further embodiment, seen in FIG. 4 (with like features being labelled with like reference numbers), a thin layer of molybdenum 44 is deposited on top of a layer of ITO 45. A layer of chromium 43 can be located between ITO layer 45 and molybdenum layer 44, to act as an adhesion layer. In this embodiment, molybdenum layer 44, optional chromium layer 43, and ITO layer 45 form transparent conductive electrode 47. Good adhesion was achieved and the electrofading worked well. The molybdenum 44 coated ITO 45 sample had a film thickness estimated at 5.5 nm based on ellipsometry data and step profilometry measurements. The electrode 47 was used in a series of laminated devices with a formulation 46 coating that was 1.75 mil thick. The device was asymmetric, meaning that the anode was the molybdenum 44 coated ITO 45 and the cathode was bare ITO 45. Initial electrofading voltage was 1.5 V but was cycled at 1.9 V. The formulation 46 that was used was a single chromophore with benzofurazan as the charge compensator. The device underwent 4,688 cycles on durability testing and its failure point, as determined by the contrast ratio being 80% of its original value, occurred at 1,700 cycles. By the same metric, a similar device but using ITO 45 as both anode and cathode failed at 550 cycles.

Figure 5:
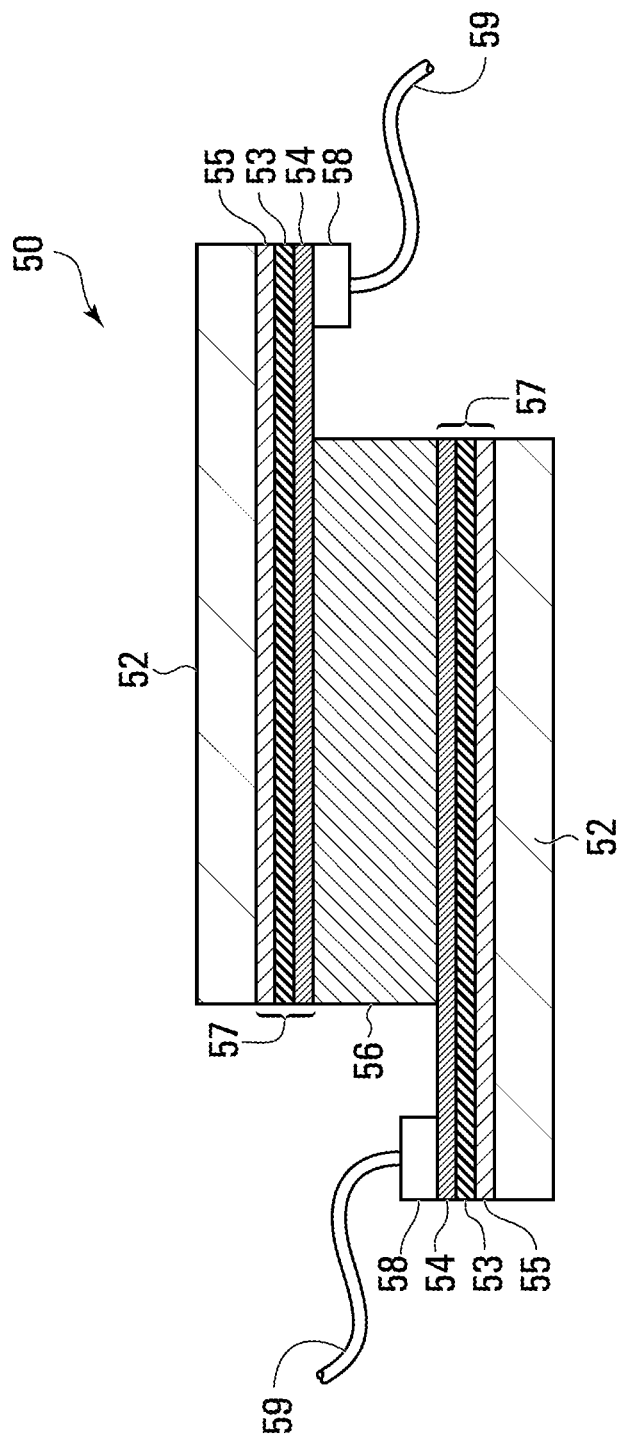
FIG. 5 is cross-sectional view of an optical filter in accordance with an embodiment of the disclosure.

The layer that provides the majority of through-plane conduction underneath the gold, molybdenum, or other material, does not need to be ITO. In other embodiments, the ITO layer can be replaced by a layer of another conductive material that exhibits similar properties and functions as ITO. Alternatively, the ITO layer may be replaced by multiple layers of material combining to provide the sheet resistance and barrier properties required. FIG. 5 (with like features being labelled with like reference numbers) shows an example of a multi-layer TCE 57 in which a layer of silver 55 is used to provide the bulk of the in-plane conductivity. A barrier layer 53 is included between silver layer 55 and a gold layer 54, in order to protect the silver from oxidization or degradation. Gold layer 54 can have the same range of thicknesses as in the previous examples (FIGS. 1-4), and as before does not need to be continuous in the planar direction parallel to PET substrate 52. In this embodiment, gold layer 54, barrier layer 53, and silver layer 55 form transparent conductive electrode 57. Barrier layer 53 may itself be an ITO layer or may comprise other types of conductive barrier material. In addition to protecting silver layer 55, barrier layer 53 can also help to prevent plasticizers in the formulation of switching material 56 from soaking into PET substrate 52. An additional layer (not shown) such can also be included underneath the silver layer in order to help with adhesion of the silver to the transparent substrate or to improve the light transmission properties of the overall structure. In an example, a layer of aluminum doped zinc oxide (ZnO:Al or AZO) is included underneath the silver layer to provide adhesion and to provide better light transmittance through matching the refractive index of the silver layer. Bus bars 58 and wire leads 59 are attached to gold layers 54, or to other parts of multi-layer TCEs 57, in the same way as in previous examples.

Figure 6:
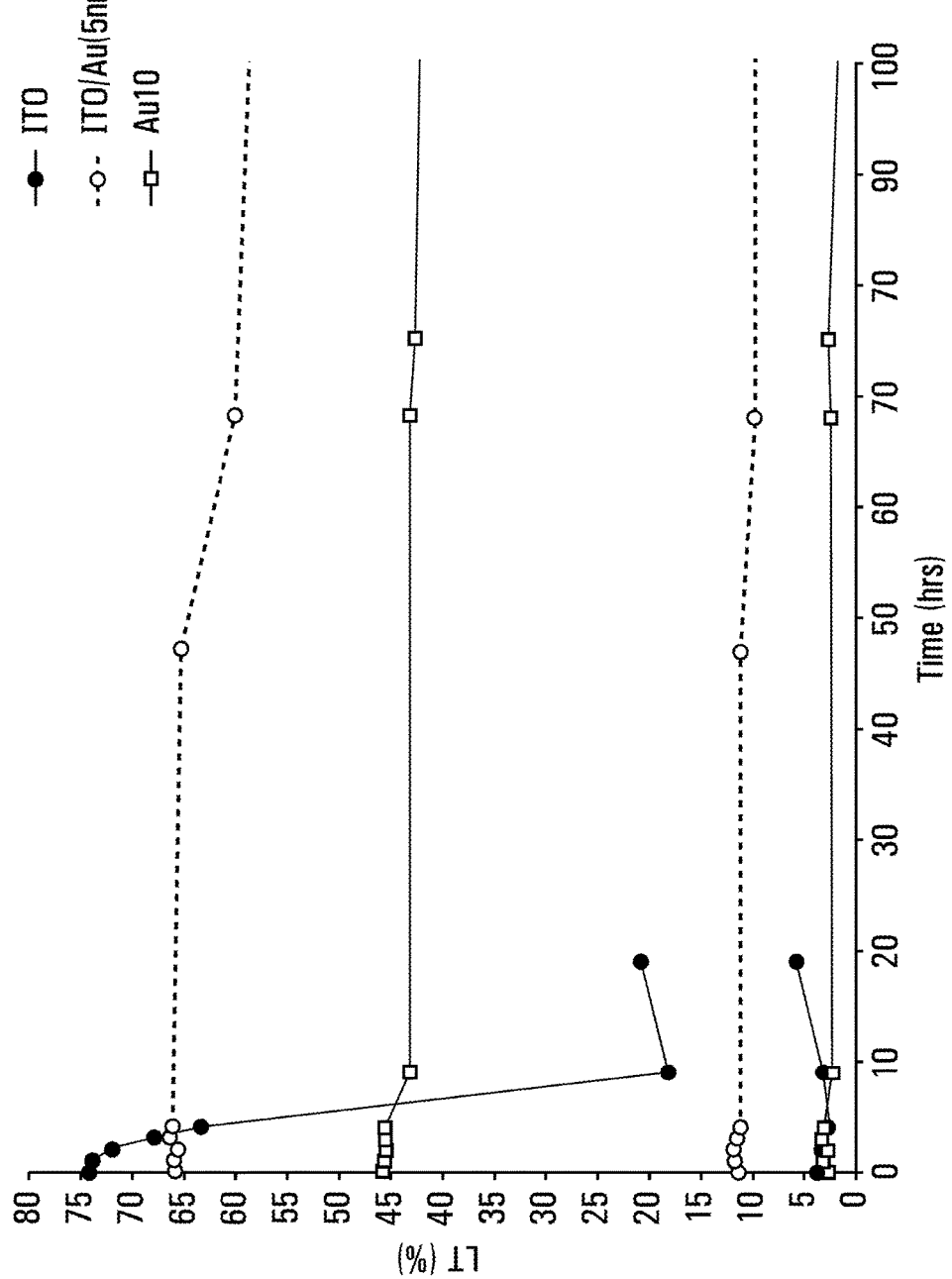
FIG. 6 is a plot of light transmittance over time for different optical filters.

In the multi-layer TCE embodiments of FIGS. 2-5, electrical durability was seen to be significantly improved relative to the same switching material used with an ITO-only TCE. FIG. 6 shows a plot comparing the light transmittance of the dark and light states of three different switching devices over time, undergoing electrical-hold testing. In other words, each device was cycled for one hour on and one hour off under a light for an extended time. A device (ITO) using only a single-layer ITO transparent conductive electrode showed significant reduction of the light state light transmittance after only about 10 hours of electrical-hold testing, as well as an increase in the dark state light transmittance, resulting in a significantly degraded contrast ratio between the light and dark states. A device (Au10) using a transparent conductive electrode comprising a 10 nm-thick gold coating (as in FIG. 1) showed much more stable light and dark states, as monitored over a 100-hour period. A device (ITO/Au(5 nm)) using a multi-layer TCE comprising a thin layer of gold on top of an ITO layer (as in FIGS. 2 and 3) showed minimal change in both the light and dark states, as monitored over a 100-hour period, with higher overall light transmittance values than the Au10 device.

Figure 7:
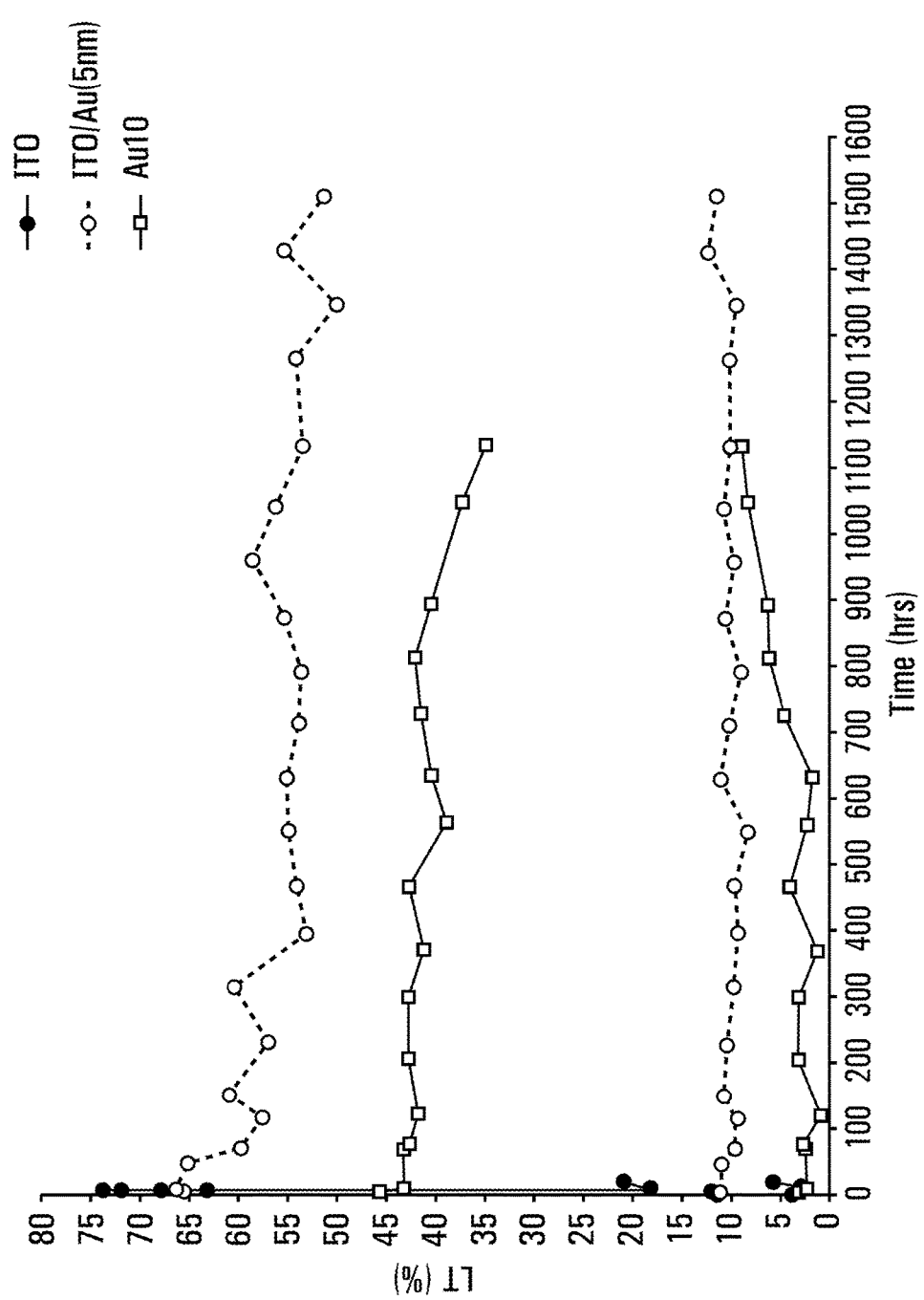
FIG. 7 is plot of light transmittance over a longer period of time for the optical filters of FIG. 6.

FIG. 7 shows the electrical-hold test results extended to 1,500 hours. Even at this range, the Au10 gold TCE device is relatively stable compared to the ITO-only device. The multi-layer TCE device, with gold deposited on ITO (ITO/Au(5 nm)), shows only a limited change in light transmittance in both the light and dark states, meaning that the contrast ratio has not been significantly degraded. Of the single-layer gold devices, TCEs using a layer of gold on a PEN substrate exhibited better performance than gold on a PET substrate because of plasticizer from the switching formulation soaking into the PET substrate due to the poor barrier properties of the gold layer. This resulted in wrinkles during lamination of the film device between PVB and glass, and could have contributed to some degradation over the long-term as well. The devices using the more chemically-resistant PEN substrate performed better and did not exhibit any wrinkling during lamination.

Figure 8:
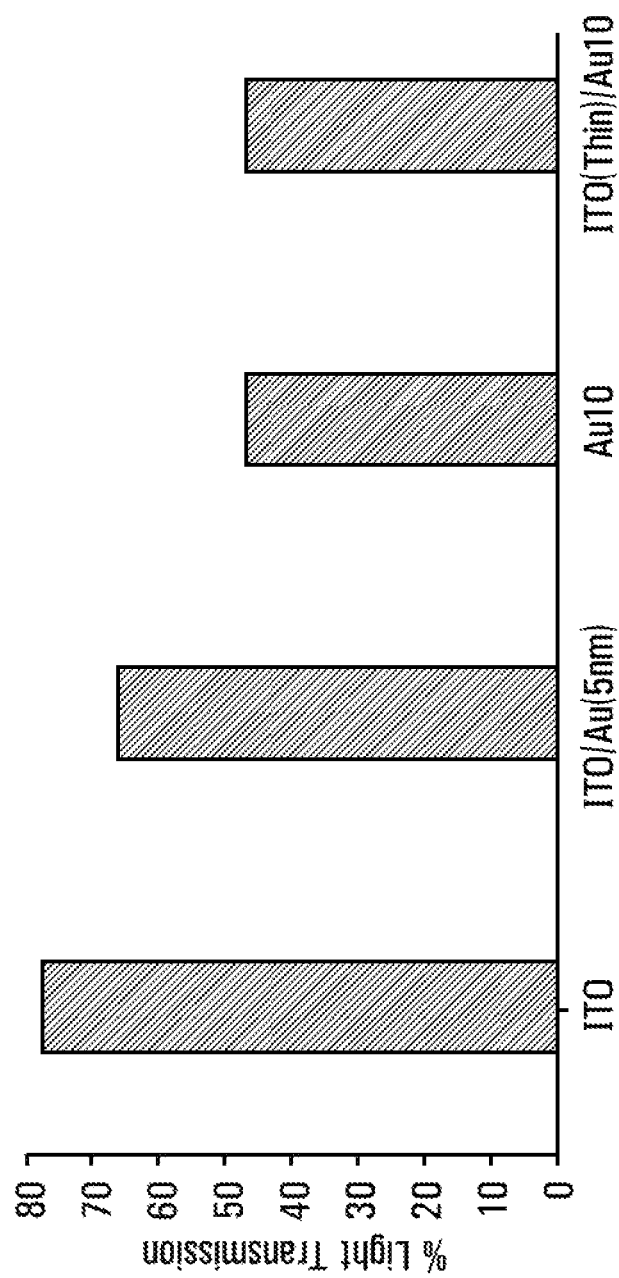
FIG. 8 is bar graph of light transmittance for different transparent conductive electrodes.

FIG. 8 shows the light transmission values for a single-layer ITO electrode, a single-layer gold electrode (Au10), and a multi-layer gold and ITO electrode, as described above. The single-layer ITO electrode transmitted almost 80% of incident light. However, as seen above in FIGS. 6 and 7, poor durability of such devices render them difficult to use in practice. The single-layer gold Au10 electrode provided improved performance with a light transmittance of about 50%. This would be suitable for some applications in which good durability is required but a high light transmittance is not. The multi-layer ITO/Au(5 nm) electrode provided improved light transmittance and good durability, at a cost of higher sheet resistance compared to the single-layer gold TCE. The light transmittance is not quite as high as the single-layer ITO electrode, but the durability performance is much better as shown in FIGS. 6 and 7. An additional example of Au10 gold on top of a thinner (higher sheet-resistance) layer of ITO (OC300) shows similar light transmittance to Au10 as a single layer, despite the additional thickness of the ITO (OC300) layer.

This description has been presented for purposes of illustration and description, but is not intended to be exhaustive or limited to the form disclosed. It will be apparent to persons skilled in the art that a number of variations and modifications can be made without departing from the scope of the claims. It is contemplated that any feature of any aspect or embodiment discussed in this specification can be implemented or combined with any feature of any other aspect or embodiment discussed in this specification, except where those features have been explicitly described as mutually exclusive alternatives.

The invention claimed is:

1. A layered structure for a variable transmittance optical filter, comprising:
    a transparent conductive electrode comprising a charge injection layer comprising one or more of gold, molybdenum, palladium, reduced graphene oxide, amorphous indium gallium zinc oxide (a-IGZO), platinum, nickel, ruthenium, rhodium, asmium, selenium, tellurium, graphene, and carbon nanotubes; and
    a substrate layer comprising a transparent substrate, wherein the substrate layer is positioned relative to the transparent conductive electrode such that light passing through the transparent conductive electrode passes through the substrate layer,
    wherein the charge injection layer is between 5 nm and 20 nm thick.

2. The layered structure of claim 1, wherein the substrate layer is adjacent the transparent conductive electrode.

3. The layered structure of claim 1, wherein the charge injection layer is adjacent the substrate layer.

4. The layered structure of claim 1, wherein the charge injection layer comprises gold.

5. The layered structure of claim 1, wherein the charge injection layer comprises one or more of: gold, molybdenum, palladium, reduced graphene, and amorphous indium gallium zinc oxide (a-IGZO).

6. The layered structure of claim 1, wherein the charge injection layer is continuous.

7. The layered structure of claim 1, wherein the charge injection layer is discontinuous.

8. The layered structure of claim 1, wherein the transparent conductive electrode further comprises a transparent conductive layer adjacent the charge injection layer.

9. The layered structure of claim 8, wherein the transparent conductive layer comprises a lower bulk conductivity than the charge injection layer.

10. The layered structure of claim 8, wherein the transparent conductive layer comprises indium tin oxide.

11. The layered structure of claim 8, wherein the charge injection layer is between 0.1 nm and 10 nm thick.

12. The layered structure of claim 8, wherein the transparent conductive layer comprises a greater through-plane conductivity than the charge injection layer.

13. The layered structure of claim 8, wherein the transparent conductive layer comprises a greater sheet resistance than the charge injection layer.

14. The layered structure of claim 8, wherein the transparent conductive layer is more transparent than the charge injection layer.

15. The layered structure of claim 8, wherein the transparent conductive layer comprises one or more metals or metallic alloys.

16. The layered structure of claim 15, wherein the transparent conductive electrode further comprises a barrier layer separating the metal layer from the charge injection layer.

17. The layered structure of claim 16, wherein the barrier layer comprises indium tin oxide.

18. The layered structure of claim 16, wherein the charge injection layer comprises gold and the metal layer comprises silver.

19. The layered structure of claim 1, further comprising a variable transmittance layer comprising a formulation being one or both of electrochromic and photochromic.

20. The layered structure of claim 19, wherein the electrochromic and/or photochromic formulation is configured such that, when exposed to light, the variable transmittance layer transitions from a first state of transmittance to a second state of transmittance, and, when exposed to an electrical stimulus, the variable transmittance layer transitions from the second state of transmittance to the first state of transmittance.

21. The layered structure of claim 19, wherein the variable transmittance layer is adjacent the charge injection layer.

22. A variable transmittance optical filter comprising:
    first and second layered structures, each layered structure comprising:
        a transparent conductive electrode comprising a charge injection layer comprising one or more of gold, molybdenum, palladium, reduced graphene oxide, amorphous indium gallium zinc oxide (a-IGZO), platinum, nickel, ruthenium, rhodium, asmium, selenium, tellurium, graphene, and carbon nanotubes; and
        a substrate layer adjacent the transparent conductive electrode, the substrate layer comprising a transparent substrate; and
        a variable transmittance layer between the charge injection layers of the first and second layered structures, the variable transmittance layer comprising an electrochromic and/or photochromic formulation.

23. A layered structure for a variable transmittance optical filter, comprising:
    a transparent conductive electrode comprising a charge injection layer comprising a layer of gold that is at least 1 nm thick; and
    a substrate layer comprising a transparent substrate, wherein the substrate layer is positioned relative to the transparent conductive electrode such that light passing through the transparent conductive electrode passes through the substrate layer.

24. The layered structure of claim 23 wherein the layer of gold is at least 10 nm thick.

25. The layered structure of claim 23, wherein the charge injection layer is substantially entirely gold.

26. A layered structure for a variable transmittance optical filter, comprising:
- a transparent conductive electrode comprising a charge injection layer comprising one or more of gold, molybdenum, palladium, reduced graphene oxide, amorphous indium gallium zinc oxide (a-IGZO), platinum, nickel, ruthenium, rhodium, asmium, selenium, tellurium, graphene, and carbon nanotubes; and
- a substrate layer comprising a transparent substrate, wherein the substrate layer is positioned relative to the transparent conductive electrode such that light passing through the transparent conductive electrode passes through the substrate layer,
- wherein the transparent conductive electrode further comprises a transparent conductive layer adjacent the charge injection layer, and
- wherein the charge injection layer is between 0.1 nm and 10 nm thick.

27. A layered structure for a variable transmittance optical filter, comprising:
- a transparent conductive electrode comprising a charge injection layer comprising one or more of gold, molybdenum, palladium, reduced graphene oxide, amorphous indium gallium zinc oxide (a-IGZO), platinum, nickel, ruthenium, rhodium, asmium, selenium, tellurium, graphene, and carbon nanotubes;
- a substrate layer comprising a transparent substrate, wherein the substrate layer is positioned relative to the transparent conductive electrode such that light passing through the transparent conductive electrode passes through the substrate layer; and
- a variable transmittance layer comprising a formulation being one or both of electrochromic and photochromic.

28. The layered structure of claim 27, wherein the electrochromic and/or photochromic formulation is configured such that, when exposed to light, the variable transmittance layer transitions from a first state of transmittance to a second state of transmittance, and, when exposed to an electrical stimulus, the variable transmittance layer transitions from the second state of transmittance to the first state of transmittance.

29. The layered structure of claim 27, wherein the variable transmittance layer is adjacent the charge injection layer.

* * * * *